United States Patent
Leong et al.

(10) Patent No.: US 12,300,244 B1
(45) Date of Patent: May 13, 2025

(54) NLP-GUIDED VIDEO THIN-SLICING FOR AUTOMATED SCORING OF NON-COGNITIVE, BEHAVIORAL PERFORMANCE TASKS

(71) Applicant: Educational Testing Service, Princeton, NJ (US)

(72) Inventors: Chee Wee Leong, Pennington, NJ (US); Xianyang Chen, Princeton, NJ (US); Vinay K. Basheerabad, Princeton, NJ (US); Chong Min Lee, Pennington, NJ (US); Patrick D. Houghton, Titusville, NJ (US)

(73) Assignee: Educational Testing Service, Princeton, NJ (US)

( * ) Notice: Subject to any disclaimer, the term of this patent is extended or adjusted under 35 U.S.C. 154(b) by 320 days.

(21) Appl. No.: 17/892,251

(22) Filed: Aug. 22, 2022

Related U.S. Application Data (60) Provisional application No. 63/235,864, filed on Aug. 23, 2021.

(51) Int. Cl.
*G10L 15/00* (2013.01)
*G06F 40/284* (2020.01)
(Continued)

(52) U.S. Cl.
CPC ............ *G10L 15/26* (2013.01); *G06F 40/284* (2020.01); *G10L 15/16* (2013.01)

(58) Field of Classification Search
CPC ......... G10L 15/00; G10L 15/04; G10L 15/06; G10L 15/063; G10L 15/083; G10L 15/18;
(Continued)

(56) References Cited

U.S. PATENT DOCUMENTS

2002/0147782 A1* 10/2002 Dimitrova .......... H04N 21/4394
709/207
2020/0075019 A1* 3/2020 Steelberg .............. G06F 40/284
(Continued)

FOREIGN PATENT DOCUMENTS

CN 111311364 A * 6/2020 ........... G06N 3/0454

OTHER PUBLICATIONS

Baltrusaitis, Tadas, Zadeh, Amir, LIM, Yao Chong, Morency, Louis-Philippe; OpenFace 2.0: Facial Behavior Analysis Toolkit; 13th IEEE International Conference on Automatic Face & Gesture Recognition; pp. 59-66; 2018.
(Continued)

*Primary Examiner* — Qi Han
(74) *Attorney, Agent, or Firm* — Jones Day (57) ABSTRACT

Data is received that encapsulates a video of a subject performing a task. This video is used to generate a transcript using an automatic speech recognition (ASR) system. A plurality of text segments are generated from the transcript and then tokenized. A textual representation of each segment is extracted by a transformer model using the tokenized text segment (i.e., the tokens corresponding to the text segment). Thereafter, for each segment, a fused representation derived from the textual representations and corresponding visual and audio features from the video is generated. A sparse attention machine learning model then selects an optimal slice of the video based on the fused representations. The optimal slice can then be input into one or more machine learning models trained to characterize performance of the task by the subject.

20 Claims, 5 Drawing Sheets

(51) Int. Cl.
*G10L 15/16* (2006.01)
*G10L 15/26* (2006.01)

(58) Field of Classification Search
CPC ......... G10L 15/20; G10L 15/24; G10L 15/26; G10L 15/28; G10L 2015/0631–0638; G10L 2015/221–228
USPC ........ 704/231, 235, 244, 250, 255, 257, 276
See application file for complete search history.

(56) References Cited

U.S. PATENT DOCUMENTS

2022/0414443 A1* 12/2022 Li ........................... H03M 1/12
2023/0171509 A1*  6/2023 Varghese ................. G06T 5/50
                                                        348/222.1

OTHER PUBLICATIONS

Chen, Lei, Zhao, Ru, Leong, Chee Wee, Lehman, Blair, Feng, Gary, Hoque, Mohammed; Automated Video Interview Judgment on a Large-Sized Corpus Collected Online; 7th IEEE International Conference on Affective Computing and Intelligent Interaction (ACII); pp. 504-509; 2017.

Chollet, Mathieu, Scherer, Stefan; Assessing Public Speaking Ability from Thin Slices of Behavior; 12th IEEE International Conference on Automatic Face & Gesture Recognition; pp. 310-316; 2017.

Devlin, Jacob; Chang, Ming-Wei, Lee, Kenton, Toutanova, Kristina; Bert: Pre-Training of Deep Bidirectional Transformers for Language Understanding; Proceedings of the Conference of the North American Chapter of the Association for Computational Linguistics: Human Language Technologies, vol. 1; Minneapolis, MN; pp. 4171-4186; Jun. 2019.

Giannakopoulos, Theodoros; pyAudioAnalysis: An Open-Source Python Library for Audio Signal Analysis; PLoS One, 10(12): e0144610; 2015.

Glavas, Goran, Somasundaran, Swapna; Two-Level Transformer and Auxiliary Coherence Modeling for Improved Text Segmentation; Proceedings of the 34th AAAI Conference on Artificial Intelligence; pp. 7797-7804; 2020.

Hemamou, Leo, Felhi, Ghazi, Martin, Jean-Claude, Clavel, Chloe; Slices of Attention in Asynchronous Video Job Interviews; 2019 8th International Conference on Affective Computing and Intelligent Interaction; IEEE; pp. 1-7; 2019.

Huffcutt, Allen, Conway, James, Roth, Philip, Stone, Nancy; Identification and Meta-Analytic Assessment of Psychological Constructs Measured in Employment Interviews; Journal of Applied Psychology, 86(5); pp. 897-913; 2001.

Nguyen, Laurent Son, Gatica-Perez, Daniel; I Would Hire You In A Minute: Thin Slice of Nonverbal Behavior in Job Interviews; Proceedings of the 2015 ACM on International Conference on Multimodal Interaction; pp. 51-58; Nov. 2015.

Zhao, Guangxiang, Lin, Junyang, Zhang, Zhiyuan, Ren, Xuancheng, Su Qi, Sun, Xu; Explicit Sparse Transformer: Concentrated Attention Through Explicit Selection; arXiv: 1912.11637; 2019.

\* cited by examiner

NLP-GUIDED VIDEO THIN-SLICING FOR AUTOMATED SCORING OF NON-COGNITIVE, BEHAVIORAL PERFORMANCE TASKS

RELATED APPLICATION

This application claims priority to U.S. Pat. App. Ser. No. 63/235,864 filed on Aug. 23, 2021, the contents of which are hereby fully incorporated by reference.

TECHNICAL FIELD

The subject matter described herein relates to techniques for modelling non-cognitive, behavioral performance tasks, by using natural language processing (NLP) to guide the selection of thin-slices of a larger recorded performance that are representative of holistic video-recorded performances.

BACKGROUND

Thin-slicing for impressionistic scoring of non-cognitive, behavioral performance tasks encapsulated within videos (e.g., public speaking or asynchronous video interviews) can be used for predicting holistic scores. Conventional approaches to thin-slicing have been centered around using random slices of a fixed-length of excepts, leveraging on the structured nature of responses to generate representative slices, or using attention-based mechanisms to detect slices of interest in the nonverbal modality. While these thin-slicing methods show promise in producing slices with predictive ability that correlates well to using the full videos, they lack fundamentally in the ability to simultaneously model both content importance and delivery coherence for unstructured spontaneous speech.

SUMMARY

In a first aspect, data is received that encapsulates a video of a subject performing a task. This video is used to generate a transcript using an automatic speech recognition (ASR) system. A plurality of text segments are generated from the transcript and then tokenized. A textual representation of each segment is extracted by a transformer model using the tokenized text segment (i.e., the tokens corresponding to the text segment). Thereafter, for each segment, a fused representation derived from the textual representations and corresponding visual and audio features from the video is generated. A sparse attention machine learning model then selects an optimal slice of the video based on the fused representations. The optimal slice can then be input into one or more machine learning models trained to characterize performance of the task by the subject. Data can then be provided (e.g., displayed, loaded into memory, stored in physical persistence, transmitted over a network, etc.) which characterizes an output of the one or more machine learning models.

In an interrelated aspect, data is received that encapsulates a video of a subject performing a task. A transcript is generated from the video using an automatic speech recognition (ASR) system from which, in turn, a plurality of text segments are generated and tokenized. These tokens are used by a transformer model to extract a textual representation of each segment. A sparse attention machine learning model then selects an optimal slice of the video based on textual representations of each segment that is similar to an effectiveness of using a full modality representation of such segment. Further, a fused representation is generated for the optimal slice which is derived from the corresponding textual representations and corresponding visual and audio features from the video. The optimal slice can be input into one or more machine learning models trained to characterize performance of the task by the subject. Data can also be provided (e.g., displayed, loaded into memory, stored in physical persistence, transmitted over a network, etc.) that characterizes an output of the one or more machine learning models.

The video of the subject performing the task can also be included. This video can be recorded by a remote computing device which can then cause the video to be transmitted over a computing network to a remote computing device.

The video can be recorded as responsive to (i.e., as part of, etc.) a computer-based asynchronous video interview (AVI). The transformer model can be trained using a corpus of training interviews, the corpus exceeding more than 100 samples. The training interview can have varying recording conditions such as variations in terms of recording platform (e.g., camera, phone, webcam, etc.), lighting, visual background, and background noise.

A subset of the tokens can be special tokens (SEP) which indicate that two sentences are being input into the transformer model.

The text segments can be generated using a coherence-aware text segmentation (CATS) framework that maintains coherence within each text segment.

The transformer model can take varying forms including a bidirectional encoder representations from transformers (BERT) model.

The sparse attention machine learning model can take varying forms including a transformer-based deep learning architecture.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter is scalable and can increase computation efficacy and reduce turnaround times for feedback and scoring of performance tasks.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter provides a tiered-approach for video-based performance analysis that leverages natural language processing and transformer architectures to select salient text segments, which are then subsequently used to drive multimodal feature extraction for the slices corresponding to these segments. Through comparative experimentation, it was demonstrated that the approach is able to pick up a top thin-slice with a predictive power that correlates well with using entire videos during the modeling phase. Furthermore, the current subject matter is advantageous in that it yields slices that are complete utterances useful for informing users on their performance during iterative practice sessions.

Oral communication has consistently been ranked as the top skill with 90 percent of hiring managers and 80 percent of business executives saying it is very important for college graduates to possess. Consequently, training and evaluation of oral presentation skills remain a priority for educators worldwide, and there are also increasingly more automated tools developed for providing feedback and assessment of such skills. While there are many forms of oral communication, the experimental validation provided here focused on prompt-based, Asynchronous Video Interview (AVI) due, in part, because of the relevance of such a task in the hiring practices impacted by the COVID-19 pandemic era, and likely beyond, as employers are increasingly conducting initial rounds of interviews virtually.

To automate the prediction of performance in AVIs, the machine learning models utilized herein were trained using a corpus of monologic, structured video interviews. These training interviews were collected online through Amazon Mechanical Turk which is one of the largest collections of structured interview responses simulating an actual hiring scenario (i.e. hiring for an entry-level office position). The utilized corpus included 260 human interviewees with a total recording time of 3784 minutes. All responses were collected from participants across the United States, and differed in gender, race, age, experience, etc. Recording conditions also varied in terms of devices, lighting, backgrounds, etc. All videos from interviewees was collected indoors. Initially, a 7-point Likert rating scale (1=Strongly Disagree, 7=Strongly Agree) was used to score each interview performance using overall hiring recommendation guidelines. During annotation, five human raters were asked to score each response using the Likert scale, and their averaged ratings were used as the ground-truth for the video. The same raters were used for scoring all the video interviewees. For this demonstration, a re-scaling for all the video scores to range 0 to 1 was performed in order to facilitate model training in deep neural networks.

Figure 1:
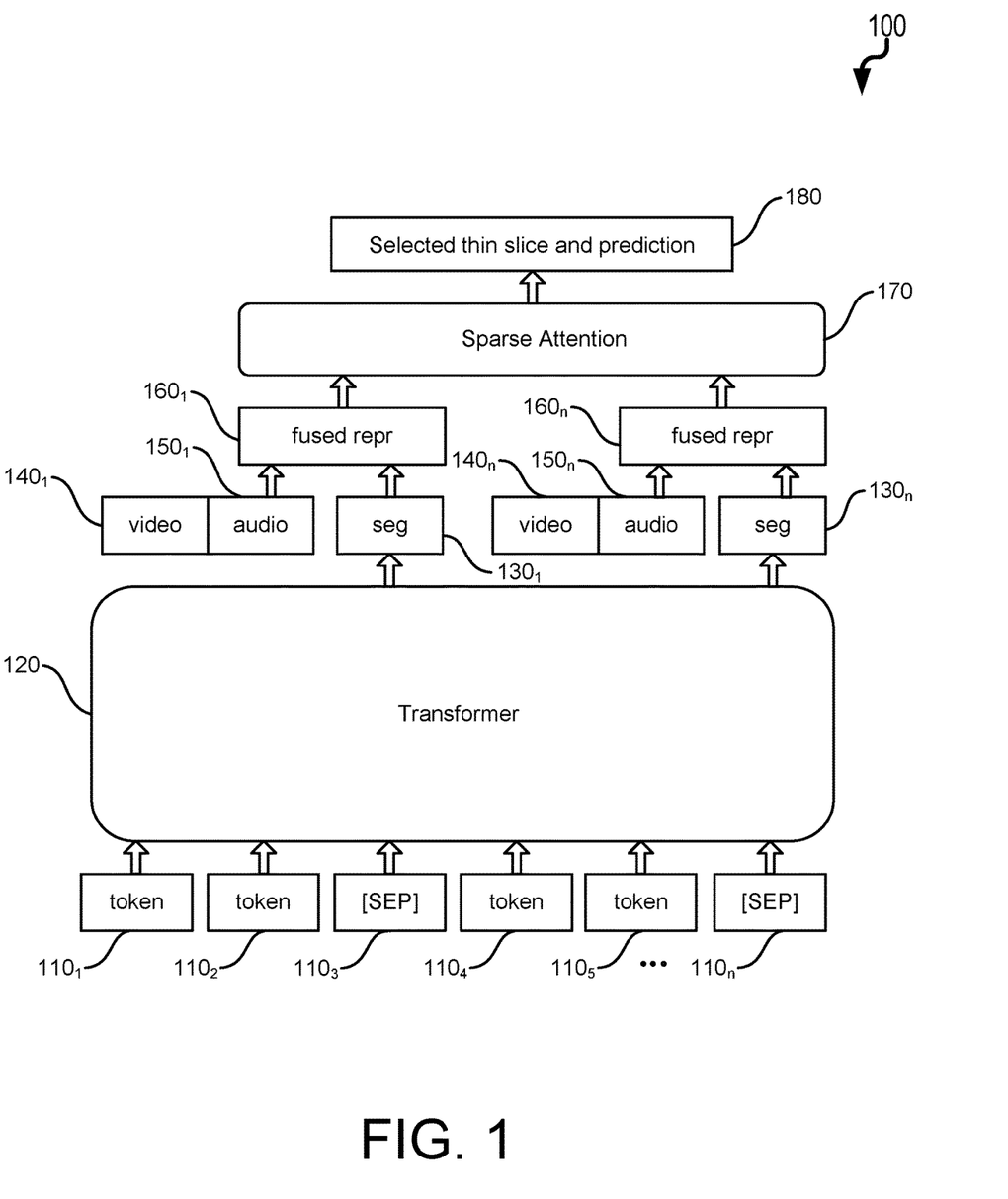
FIG. 1 is a diagram illustrating a first machine learning model architecture for NLP-guided video thin-slicing for automated scoring of non-cognitive, behavioral performance tasks.

Given a video recording of the performance of a speaker, the three different modalities (video, audio and text) were separated and provided as inputs to begin pre-processing. With the current subject matter, a client-based, streaming automatic speech recognition (ASR) module was used so that the spoken content, in turn, can be used to drive textual analysis soon after the video is uploaded to a processing server (e.g., a cloud-based server, etc.). The tiered approach in thin-slicing provided herein comprises two major components. First, an in-depth analysis was applied to the ASR transcript to generate text segments that are appropriately bounded to maintain coherence within each segment, through the Coherence-Aware Text Segmentation (CATS) framework. The CATS framework comprises two hierarchically connected transformer networks that act as a multi-task learning model that couples sentence-level segmentation with a coherence objective in order to more precisely identify coherent text groupings. The segmentation model for CATS was adapted for the thin-slicing task through finetuning of thresholds for spoken transcripts. Secondly, once individual text segments were obtained, a transformer-based analysis was applied to identify the saliency of each segment in modeling the video interview task. Additionally, the identification of the most salient segment through multimodal evidence was aided by extracting and modeling using nonverbal features and vocal features as well, as shown in diagram 100 of FIG. 1. Besides the identification, the multimodal vectors can also be used for downstream scoring tasks. Using the two-tiered approach, the segment that is selected as the most representative thin-slice during the inference step is both a complete utterance as well as one that is informed by multimodal evidence.

Referring again to FIG. 1, text segments derived from an ASR processing of a video segment are tokenized into a series of tokens $110_{1...n}$ (some of which may include special tokens SEP which indicate that two sentences are being inputted) for input into a transformer 120. These text segments can be generated using the CATS framework. The transformer 120 can take various forms including, as example, be a transformer-based machine learning model or ensemble of models for natural language processing (NLP) such as Bidirectional Encoder Representations from Transformers (BERT). The output of the transformer 120 comprises a series of segments $130_{1...n}$ which can be fused with visual features $140_{1...n}$ (i.e., video) and audio features $150_{1...n}$ extracted from the corresponding passage of the video to result in a fused representation $160_{1...n}$. These fused representations $160_{1...n}$ are then input into a sparse attention model 170. The sparse attention model 170 can be a deep neural network model (e.g., a transformer based architecture, etc.) which predicts what comes next in a sequence. Here, the sparse attention model 170 outputs a selected thin slice of the video which can then be input into one more machine learning models to generate a score (i.e., make a prediction) that characterizes the performance of the subject in the recorded video (without necessarily utilizing scores from other video slices). Thin slices belonging to the same video sharing a single label can be provided as training instances to the model. Such slices from multiple videos are used in the training process. The model parameters can be fine-tuned through an iterative process where each thin slice as input is used to update the model parameter. The slice which is most representative of the video is given the most weight in the update process.

Figure 2:
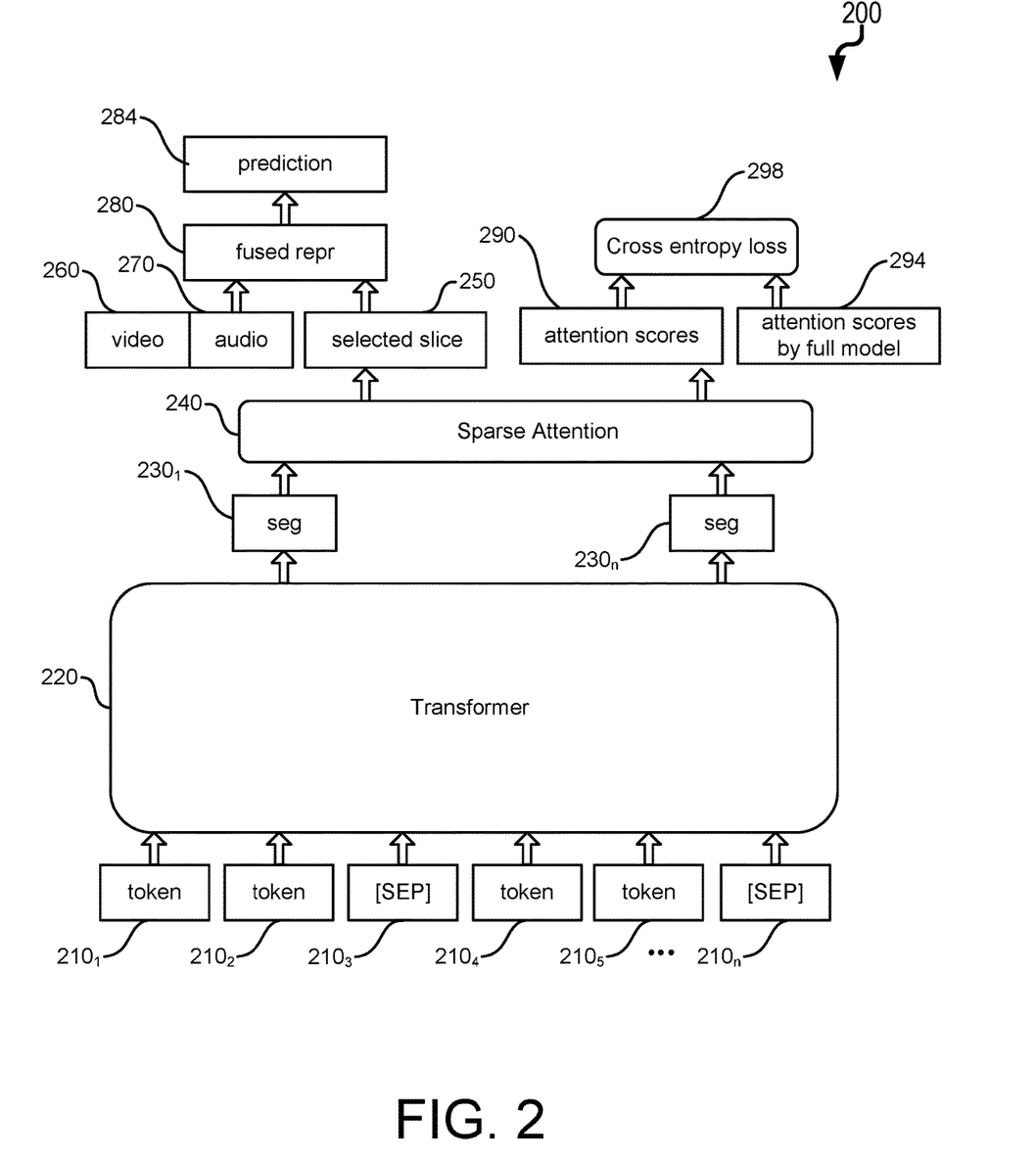
FIG. 2 is a diagram illustrating a second machine learning model architecture for NLP-guided video thin-slicing for automated scoring of non-cognitive, behavioral performance tasks.

An optimal representative slice can be identified using the techniques provided herein which examine the entire set of slices which can significantly reduce turnaround times for feedback and scoring of the performance tasks, i.e., video interview. This identification can be implemented using a distilled version of a multimodal thin-slicing capability, as shown in diagram 200 of FIG. 2. Consistent with the previously described two-tiered approach illustrated in FIG. 1, this distilled version models the most representative thin-slice using the self-attention in the network trained with multi-modal evidence, given only text inputs. In other words, the distilled version seeks to pick out the most salient segment based exclusively on textual evidence, avoiding nonverbal and vocal features altogether. In terms of Mean Absolute Error (MAE), the experimental performance of two thin-slicing variants was as follows: Full Modality (0.1231), Distilled Modality (0.1232).

Referring again to FIG. 2, text segments derived from an ASR processing of a video segment are tokenized into a series of tokens $210_1 \ldots {}_n$ (some of which may include special tokens SEP which indicate that two sentences are being inputted) for input into a transformer 220. These text segments can be generated using the CATS framework. The transformer 220 can take various forms including, as example, be a transformer-based machine learning model or ensemble of models for natural language processing (NLP) such as Bidirectional Encoder Representations from Transformers (BERT). The output of the transformer 220 comprises a series of segments $230_1 \ldots {}_n$ which can be input into a sparse attention model 240. The sparse attention model 240 can be used to identify a selected slice 250 of the video that best characterizes the performance of the subject. This selected slice 250 can be fused with features from the video/visual component 260 of the video and with features extracted from the audio component 270 of the video to result in a fused representation 280. The fused representation can be input into one or more machine learning models to yield a prediction 284. The output of the sparse attention model 240 can also generate attention scores 290 that is similar to the attention scores from the full model 294 by minimizing cross-entropy loss 298.

Figure 3:
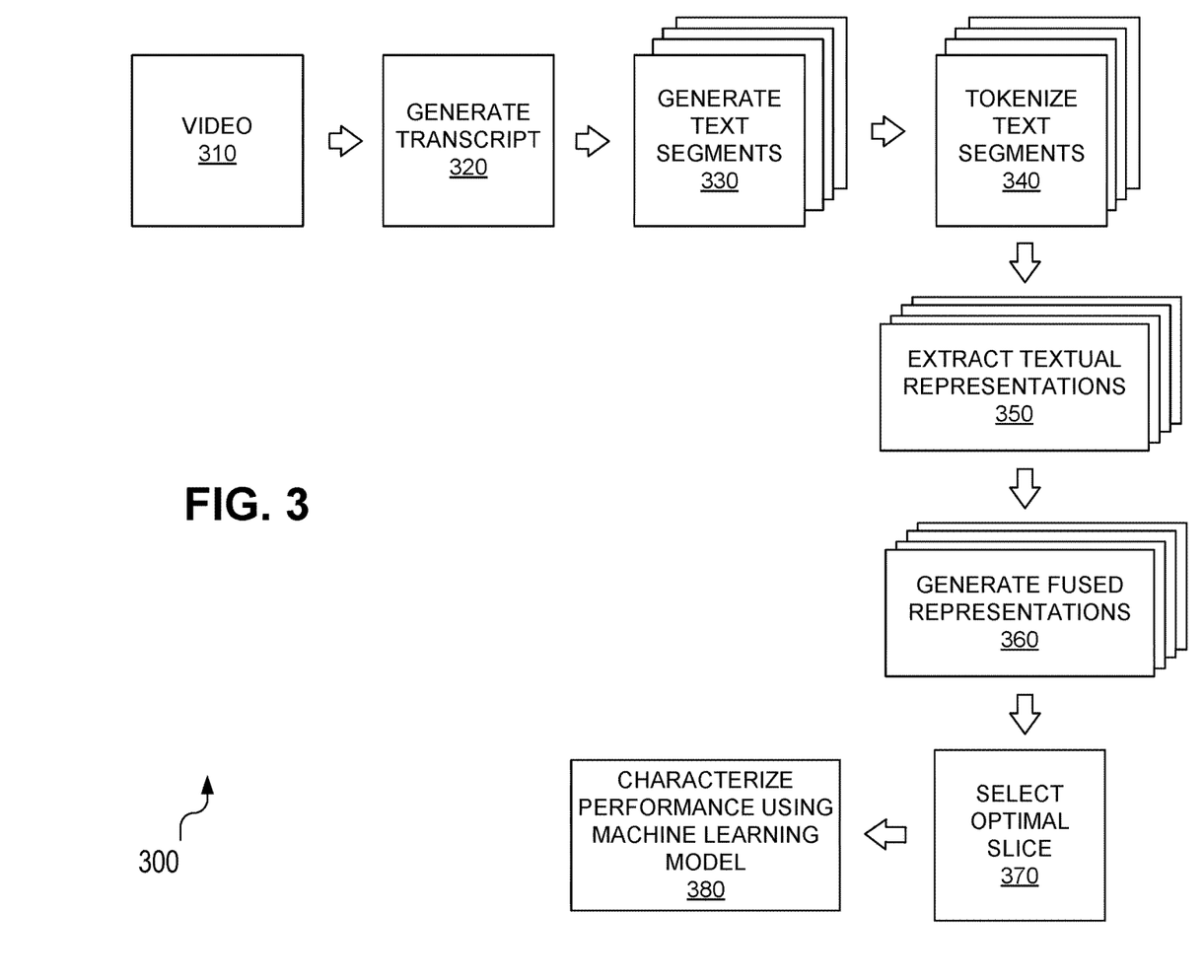
FIG. 3 is a first process flow diagram illustrating NLP-guided video thin-slicing for automated scoring of non-cognitive, behavioral performance tasks.

FIG. 3 is a process flow diagram 300 in which, at 310, data is received that encapsulates a video of a subject performing a task such as participating in an interview (including an automated interview with pre-set questions). Thereafter, at 320, a transcript is generated from the video using an automatic speech recognition (ASR) system. This transcript is used, at 330, to generate a plurality of text segments from the transcript which are, at 340, tokenized. A transformer model then, at 350, extracts a textual representation of each segment based on the tokenized text segment. A fused representation is then generated, at 360, for each segment which is derived from the textual representations and corresponding visual and audio features from the video. This fused representation is then used, at 370, by a sparse attention machine learning model to select an optimal slice of the video (i.e., a slice that best represents performance of the subject). This optimal slice is then input, at 380, into one or more machine learning models trained to characterize performance of the task by the subject. The output of these one or more machine learning models can be consumed by an application or process. In some cases, the output can be provided (e.g., displayed on an electronic visual display, persisted in physical storage, loaded into memory, and/or transmitted over a network to a remote computing device, etc.).

Figure 4:
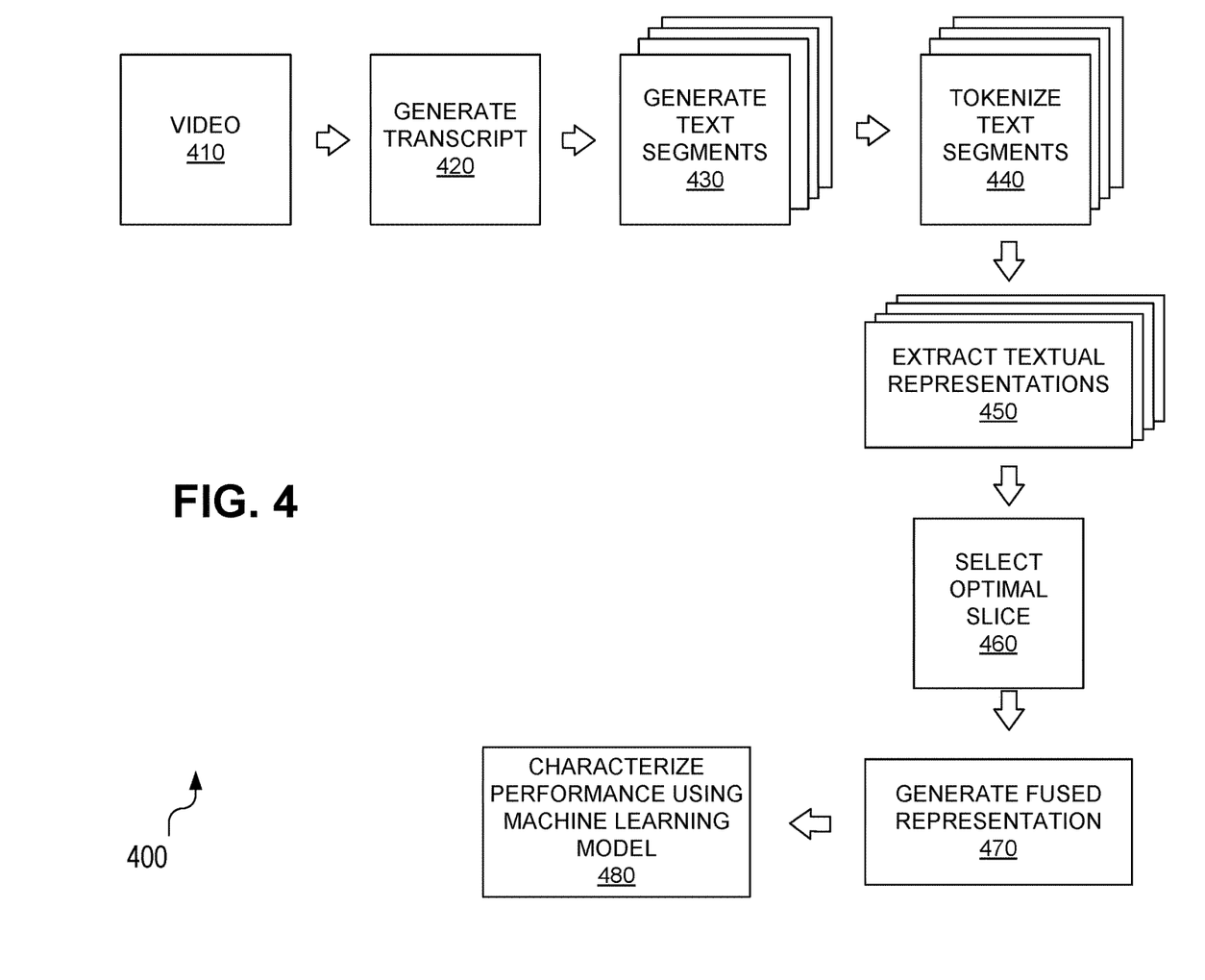
FIG. 4 is a second process flow diagram illustrating NLP-guided video thin-slicing for automated scoring of non-cognitive, behavioral performance tasks.

FIG. 4 is a process flow diagram 400 in which, at 410, data is received that encapsulates a video of a subject performing a task such as participating in an interview (including an automated interview with pre-set questions). Thereafter, at 420, a transcript is generated from the video using an automatic speech recognition (ASR) system. This transcript is used, at 430, to generate a plurality of text segments from the transcript which are, at 440, tokenized. A transformer model then, at 450, extracts a textual representation of each segment based on the tokenized text segment. A sparse attention machine learning model then selects, at 460, an optimal slice of the video (i.e., a slice that best represents performance of the subject). Further, at 470, a fused representation is then generated, at 470, for the selected optimal slice which is derived from the textual representations and corresponding visual and audio features from the video. This fused representation is then input, at 480, into one or more machine learning models trained to characterize performance of the task by the subject. The output of these one or more machine learning models can be consumed by an application or process. In some cases, the output can be provided (e.g., displayed on an electronic visual display, persisted in physical storage, loaded into memory, and/or transmitted over a network to a remote computing device, etc.)

Figure 5:
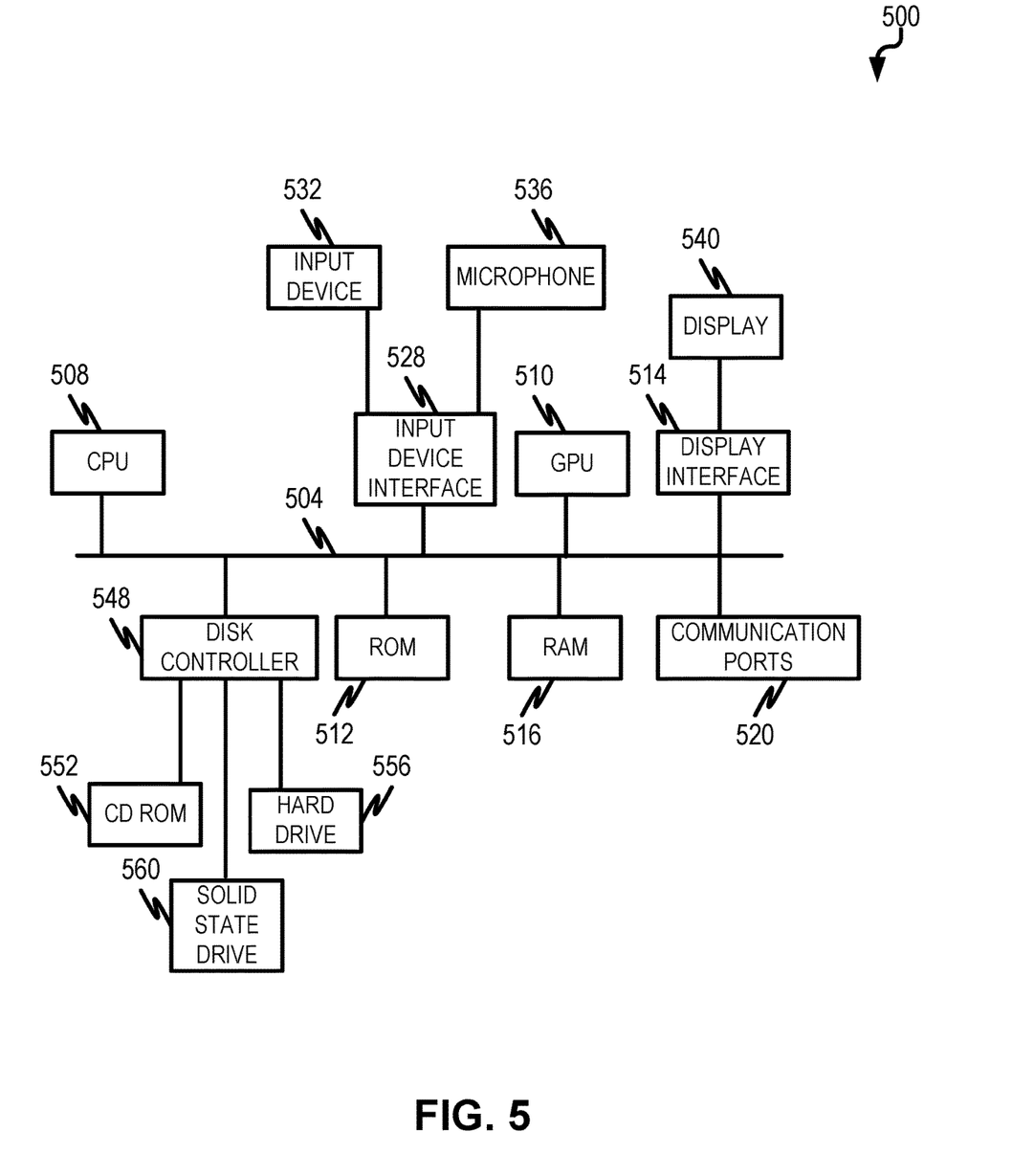
FIG. 5 is an example computing device for implementing aspects of the subject matter described herein.

FIG. 5 is a diagram 500 illustrating a sample computing device architecture for implementing various aspects described herein. A bus 504 can serve as the information highway interconnecting the other illustrated components of the hardware. A processing system 508 labeled CPU (central processing unit) (e.g., one or more computer processors/data processors at a given computer or at multiple computers), can perform calculations and logic operations required to execute a program. A non-transitory processor-readable storage medium, such as read only memory (ROM) 512 and random access memory (RAM) 516, can be in communication with the processing system 508 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 548 can interface with one or more optional disk drives to the system bus 504. These disk drives can be external or internal floppy disk drives such as 560, external or internal CD-ROM, CD-R, CD-RW or DVD, or solid state drives such as 552, or external or internal hard drives 556. As indicated previously, these various disk drives 552, 556, 560 and disk controllers are optional devices. The system bus 504 can also include at least one communication port 520 to allow for communication with external devices either physically connected to the computing system or available externally through a wired or wireless network. In some cases, the at least one communication port 520 includes or otherwise comprises a network interface.

To provide for interaction with a user, the subject matter described herein can be implemented on a computing device having a display device 540 (e.g., a CRT (cathode ray tube) or LCD (liquid crystal display) monitor) for displaying information obtained from the bus 504 via a display interface 514 to the user and an input device 532 such as keyboard and/or a pointing device (e.g., a mouse or a trackball) and/or a touchscreen by which the user can provide input to the computer. Other kinds of input devices 532 can be used to provide for interaction with a user as well; for example, feedback provided to the user can be any form of sensory feedback (e.g., visual feedback, auditory feedback by way of a microphone 536, or tactile feedback); and input from the user can be received in any form, including acoustic, speech, or tactile input. The input device 532 and the microphone 536 can be coupled to and convey information via the bus 504 by way of an input device interface 528. Other computing devices, such as dedicated servers, can omit one or more of the display 540 and display interface 514, the input device 532, the microphone 536, and input device interface 528.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving data encapsulating a video of a subject performing a task;
   generating a transcript from the video using an automatic speech recognition (ASR) system;
   generating a plurality of text segments from the transcript;
   tokenizing the text segments;
   extracting, by a transformer model using the tokenized text segment, a textual representation of each segment;
   generating, for each segment, a fused representation derived from the textual representations and corresponding visual and audio features from the video;
   selecting, using a sparse attention machine learning model, an optimal slice of the video based on the fused representations;
   inputting the optimal slice into one or more machine learning models trained to characterize performance of the task by the subject; and
   providing data comprising an output of the one or more machine learning models.

2. The method of claim 1 further comprising:
   recording the video of the subject performing the task; and
   transmitting the video over a computing network to a remote computing device.

3. The method of claim 1, wherein the video is a response to a computer-based asynchronous video interview (AVI).

4. The method of claim 3, wherein the transformer model is trained using a corpus of training interviews, the corpus exceeding more than 100 samples.

5. The method of claim 4, wherein recording conditions of the training interviews varied in terms of recording platform, lighting, visual background, and background noise.

6. The method of claim 1, wherein a subset of the tokens comprise special tokens (SEP) which indicate that two sentences are being input into the transformer model.

7. The method of claim 1, wherein the text segments are generated using a coherence-aware text segmentation (CATS) framework that maintains coherence within each text segment.

8. The method of claim 1, wherein the transformer model comprises a bidirectional encoder representations from transformers (BERT) model.

9. The method of claim 1, wherein the sparse attention machine learning model comprises a transformer-based deep learning architecture.

10. The method of claim 1, wherein the providing data comprises one or more of: displaying the output of the one or more machine learning models in a graphical user interface, loading the output of the one or more machine learning models into memory, storing the output of the one or more machine learning models in physical persistence, or transmitting the output of the one or more machine learning models over a network to a remote computing system.

11. A computer-implemented method comprising:
receiving data encapsulating a video of a subject performing a task;
generating a transcript from the video using an automatic speech recognition (ASR) system;
generating a plurality of text segments from the transcript;
tokenizing the text segments;
extracting, by a transformer model using the tokenized text segment, a textual representation of each segment;
selecting, using a sparse attention machine learning model, an optimal slice of the video based on textual representations of each segment that is similar to an effectiveness of using a full modality representation of such segment;
generating, for the optimal slice, a fused representation derived from the corresponding textual representations and corresponding visual and audio features from the video;
inputting the optimal slice into one or more machine learning models trained to characterize performance of the task by the subject; and
providing data comprising an output of the one or more machine learning models.

12. The method of claim 11 further comprising:
recording the video of the subject performing the task; and
transmitting the video over a computing network to a remote computing device.

13. The method of claim 12, wherein the video is a response to a computer-based asynchronous video interview (AVI).

14. The method of claim 13, wherein the transformer model is trained using a corpus of training interviews, the corpus exceeding more than 100 samples.

15. The method of claim 14, wherein recording conditions of the training interviews varied in terms of recording platform, lighting, visual background, and background noise.

16. The method of claim 11, wherein a subset of the tokens comprise special tokens (SEP) which indicate that two sentences are being input into the transformer model.

17. The method of claim 11, wherein the text segments are generated using a coherence-aware text segmentation (CATS) framework that maintains coherence within each text segment.

18. The method of claim 11, wherein the transformer model comprises a bidirectional encoder representations from transformers (BERT) model.

19. The method of claim 11, wherein the sparse attention machine learning model comprises a transformer-based deep learning architecture.

20. A system comprising:
at least one hardware processor; and
memory storing instructions which, when executed by the at least one hardware processor result in operations comprising:
receiving data encapsulating a video of a subject performing a task;
generating a transcript from the video using an automatic speech recognition (ASR) system;
generating a plurality of text segments from the transcript;
tokenizing the text segments;
extracting, by a transformer model using the tokenized text segment, a textual representation of each segment;
generating, for each segment, a fused representation derived from the textual representations and corresponding visual and audio features from the video;
selecting, using a sparse attention machine learning model, an optimal slice of the video based on the fused representations,
inputting the optimal slice into one or more machine learning models trained to characterize performance of the task by the subject; and
providing data comprising an output of the one or more machine learning models.

* * * * *